United States Patent
Ye et al.

(10) Patent No.: US 10,033,573 B2
(45) Date of Patent: Jul. 24, 2018

(54) PROTECTION SWITCHING METHOD, NETWORK, AND SYSTEM

(71) Applicant: Huawei Technologies Co., Ltd., Shenzhen (CN)

(72) Inventors: Min Ye, Chengdu (CN); Hao Long, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 198 days.

(21) Appl. No.: 14/882,219

(22) Filed: Oct. 13, 2015

(65) Prior Publication Data

US 2016/0036622 A1 Feb. 4, 2016

Related U.S. Application Data

(63) Continuation of application No. PCT/CN2013/074260, filed on Apr. 16, 2013.

(51) Int. Cl.
*H04L 12/24* (2006.01)
*H04L 12/707* (2013.01)
(Continued)

(52) U.S. Cl.
CPC ...... *H04L 41/0654* (2013.01); *H04L 41/0663* (2013.01); *H04L 45/22* (2013.01); *H04L 45/28* (2013.01); *H04L 45/04* (2013.01)

(58) Field of Classification Search
CPC . H04L 41/0663; H04L 45/22; H04L 41/0654; H04L 45/28; H04L 45/04; H04L 12/707; H04L 12/24
See application file for complete search history.

(56) References Cited

U.S. PATENT DOCUMENTS 7,804,767 B1 * 9/2010 Owens ............... H04L 45/00
370/217
2004/0114530 A1 6/2004 Cornet et al.
(Continued)

FOREIGN PATENT DOCUMENTS

CN 101998186 A 3/2011
CN 102843291 A * 12/2012
(Continued)

OTHER PUBLICATIONS

Vladescu et al., "Protection Interworking-Linear Protection generic models," pp. 1-12, Fujitsu Network Communications, Richardson, Texas (Dec. 4, 2012).

(Continued)

*Primary Examiner* — Charles C Jiang
*Assistant Examiner* — Kyaw Z Soe
(74) *Attorney, Agent, or Firm* — Leydig, Voit & Mayer, Ltd.

(57) ABSTRACT

Embodiments of the present invention provide a protection switching method, network node, and system, where a communication method includes: when a first transport entity changes from a standby state to an active state, determining that in a second protected domain, there is only a protection transport entity that is connected to the first boundary node; switching a service to a first protection transport entity; and sending a first automatic protection switching APS message that carries a request of triggering inter-domain protection switching. By using the protection switching method, network node, and system that are provided by the embodiments of the present invention, end-to-end protection switching may be implemented, which enhances robustness of a protection network.

16 Claims, 8 Drawing Sheets

(51) Int. Cl.
*H04L 12/703* (2013.01)
*H04L 12/715* (2013.01)

(56) References Cited

U.S. PATENT DOCUMENTS

| | | | | |
|---|---|---|---|---|
| 2005/0249119 | A1* | 11/2005 | Elie-Dit-Cosaque | H04L 12/2856 370/236 |
| 2009/0109843 | A1* | 4/2009 | Yang | H04L 12/66 370/225 |
| 2009/0201932 | A1* | 8/2009 | Kumar | H04L 45/302 370/395.5 |
| 2010/0061724 | A1* | 3/2010 | Sun | H04L 45/00 398/45 |
| 2010/0214913 | A1* | 8/2010 | Kompella | H04L 45/125 370/230 |
| 2010/0309821 | A1* | 12/2010 | Sergeev | H04L 12/437 370/256 |
| 2011/0058472 | A1* | 3/2011 | Owens | H04L 45/00 370/228 |
| 2011/0229123 | A1 | 9/2011 | Li et al. | |
| 2012/0141117 | A1 | 6/2012 | Kang | |
| 2012/0294140 | A1* | 11/2012 | Cheung | H04L 45/24 370/216 |
| 2013/0064073 | A1* | 3/2013 | Cheng | H04L 45/22 370/225 |
| 2015/0195125 | A1* | 7/2015 | Wu | H04L 41/06 370/225 |

FOREIGN PATENT DOCUMENTS

| | | |
|---|---|---|
| CN | 102843291 A1 * | 12/2012 |
| EP | 2028768 A1 | 2/2009 |

OTHER PUBLICATIONS

"Series G: Transmission Systems and Media, Digital Systems and Networks; Digital Networks—Optical transport networks; Optical Transport Network (OTN): Linear protection," Recommendation ITU-T G.873.1, pp. i-21, International Telecommunication Union, Geneva, Switzerland (Jul. 2011).

"Series G: Transmission Sytems and Media, Digital Systems and Networks; Packet over Transport aspects—Ethernet over Transport aspects; Series Y: Global Information Infrastructure, Internet Protocol Aspects and Next-Generation Networks; Internet protocol aspects—Transport; Ethernet linear protection switching," Recommendation ITU-T G.8031/Y.1342, pp. i-86, International Telecommunication Union, Geneva, Switzerland (Jun. 2011).

"Protection Interworking-Linear protection generic models," Fujitsu Network Communications, Telecommunication Standardization Sector, pp. 1-12, International Telecommunication Union, Geneva, Switzerland (Apr. 2016).

Abbas et al., "G.iwk Living list," pp. 1-29 (Feb. 25-Mar. 1, 2013).

Kim et al., "Protection switching interworking control between linear protections," ETRI, pp. 1-6 (Feb. 25-Mar. 1, 2013).

"Network architecture options for protection switching interworking," (Mar. 22, 2012).

* cited by examiner

| Field | | Value | Description | Priority |
|---|---|---|---|---|
| Request/ State | | 1111 | Protection lock (LP) | Highest |
| | | 1110 | Protection path signal fail (SF-P) | |
| | | 1101 | Forced switching (FS) | |
| | | 1011 | Working path signal fail (SF-W) | |
| | | 1001 | Signal degrade (SD) | |
| | | 0111 | Manual switching (MS) | |
| | | 0110 | Manual switching to working (MS-W) | |
| | | 0101 | Wait to restore (WTR) | |
| | | 0100 | Exercise (EXER) | |
| | | 0010 | Reverse request (RR) | |
| | | 0001 | Non-return (DNR) | |
| | | 0000 | No request (NR) | Lowest |
| | | Other | Reserved | |
| Protection Type | A | 0 | Do not use an APS protocol | |
| | | 1 | Need an APS protocol | |
| | B | 0 | 1+1 (permanent bridge) | |
| | | 1 | 1:1 (impermanent bridge) | |
| | D | 0 | Single-ended switching | |
| | | 1 | Dual-ended switching | |
| | R | 0 | Non-return manner | |
| | | 1 | Return manner | |
| Requested Signal | | 0 | No signal | |
| | | 1 | Protected normal signal | |
| | | 2-255 | Reserved | |
| Bridged Signal | | 0 | No signal | |
| | | 1 | Protected normal signal | |
| | | 2-255 | Unprotected signal | |

PROTECTION SWITCHING METHOD, NETWORK, AND SYSTEM

CROSS-REFERENCE TO RELATED APPLICATIONS

This application is a continuation of International Patent Application No. PCT/CN2013/074260, filed on Apr. 16, 2013, which is hereby incorporated by reference in its entirety.

TECHNICAL FIELD

The present invention relates to the field of communications technologies, and in particular, to a protection switching method, network node, and system.

BACKGROUND

In an existing network architecture, linear protection and ring protection are most commonly used service protection modes. Linear protection is applied to a linear network, where the linear network refers to that a network topology between two network nodes is linear. Linear protection between two network nodes generally requires that multiple transport entities exist between the two network nodes, where one transport entity (transport entity) is a working transport entity, and another transport entity is a protection transport entity. A basic principle of linear protection is that, when a working transport entity becomes faulty, a network node switches a service to a path of a protection transport entity. Linear protection includes a 1+1 protection structure and a 1:1 protection structure.

When the 1+1 protection structure is used, a service is transmitted on a working transport entity and a protection transport entity simultaneously, and a receive end performs selective receiving according to a certain rule. For example, in the case of normal working, the service is received from the working transport entity; and when it is detected that the working transport entity becomes faulty, the service is received from the protection transport entity. The 1+1 protection structure may be unidirectional or bidirectional switching. In the case of unidirectional 1+1 protection, automatic protection switching (APS) packet negotiation does not need to be performed; in the case of bidirectional 1+1 protection, APS packet negotiation needs to be performed, so as to ensure that a same transport entity is selected in both directions.

The 1:1 protection structure is bidirectional. When the 1:1 protection structure is used, a transmit end and a receive end perform APS packet negotiation to determine a working transport entity, and the transmit end and the receive end send and receive a service only through the working transport entity. The transmit end and the receive end switch the service to a protection transport entity according to APS packet negotiation only when the working transport entity becomes faulty.

A network topology in a practical application is usually more complex. As shown in FIG. 1, in the prior art, nodes A, B, C, D, E, and F in a network constitute a linear protection network between the nodes A and F. In the network topology, A and F are not directly connected. It is assumed that a transport entity (that is, a transport entity 6→7→8 in the figure) from A to F through B and D is a current active transport entity; when a link (that is, a transport entity 6) between A and B becomes faulty, theoretically, a service needs to be switched to a transport entity that is from A to F through C and E (that is, a transport entity 1→2→5 in the figure), or from A to F through C and D (that is, a transport entity 1→3→8 in the figure). The node A can detect a link fault, and therefore the service is switched to a link (that is, a transport entity 1) between A and C; however, for B, D, and F, links between them are normal, and therefore a fault cannot be detected in corresponding fault detection, so that these nodes do not perform corresponding switching. Therefore, corresponding protection switching cannot be completed, and service protection cannot be implemented.

SUMMARY

In view of this, embodiments of the present invention provide a protection switching method, apparatus, and system, so as to effectively implement protection switching in a multi-node linear protection network, thereby protecting a service.

According to a first aspect, a protection switching method is provided, including: when a first transport entity that is connected to a first boundary node and in a first protected domain changes from a standby state to an active state, determining, by the first boundary node, that in a second protected domain, there is only a protection transport entity that is connected to the first boundary node, and there is no working transport entity that is connected to the first boundary node, where the first boundary node is both a boundary node of the first protected domain and a boundary node of the second protected domain; if the first boundary node determines that in the second protected domain, there is only a protection transport entity that is connected to the first boundary node, and there is no working transport entity that is connected to the first boundary node, switching, by the first boundary node, a service to a first protection transport entity, where the first protection transport entity is a transport entity that is connected to the first boundary node and in the second protected domain; and if the first boundary node determines that in the second protected domain, there is only a protection transport entity that is connected to the first boundary node, and there is no working transport entity that is connected to the first boundary node, sending, by the first boundary node by using the first protection transport entity, a first automatic protection switching APS message that carries a request of triggering inter-domain protection switching.

With reference to the first aspect, in a first possible implementation manner, the request of triggering inter-domain protection switching is carried in a request and state field in the first APS message.

With reference to the first aspect or the first possible implementation manner, in a second possible implementation manner, the first APS message triggers a second boundary node that receives the first APS message to: switch the service to the first protection transport entity; and after it is determined that in a third protected domain, there is only a protection transport entity that is connected to the second boundary node, perform protection switching in the third protected domain, and send a second APS message that carries a request of triggering inter-domain protection switching, where the second boundary node is both a boundary node of the second protected domain and a boundary node of the third protected domain.

With reference to the first and the second possible implementation manners, in a third possible implementation manner, the first boundary node receives a third APS message that carries a request of triggering inter-domain protection switching and is sent by using the first transport entity, and performs protection switching to change the first transport entity from the standby state to the active state.

With reference to the first to the third possible implementation manners, in a fourth possible implementation manner, the first boundary node receives a fourth APS message that is from the second protected domain and carries a request of notifying that an adjacent protected domain fails, where the fourth APS message further carries an identifier of a third boundary node; the first boundary node determines, according to the identifier, whether the third boundary node is a peer node of the first boundary node, where the peer node of the first boundary node refers to a node that is both a boundary node of the first protected domain and a boundary node of the second protected domain; and if a result of the determining is yes, the first boundary node performs protection switching to change the first transport entity from the standby state to the active state. If the result of the determining is no, the first boundary node forwards the fourth APS message in the second protected domain.

With reference to all the foregoing implementation manners, in a fifth possible implementation manner, the protection switching method is applied to a 1:1 protection mechanism, and the first protection transport entity is a transport entity with a highest priority among all available transport entities that are in the second protected domain and are connected to the first boundary node.

According to a second aspect, another protection switching method is provided, including: receiving, by a first boundary node, a first automatic protection switching APS message that is from a second protected domain and carries a request of notifying that an adjacent protected domain fails, where the first APS message further carries an identifier of a second boundary node, and the first boundary node is a boundary node of both a first protected domain and a boundary node of the second protected domain; and identifying, by the first boundary node according to the identifier, that the second boundary node is a peer node of the first boundary node, where the peer node of the first boundary node refers to a node that is both a boundary node of the first protected domain and a boundary node of the second protected domain; and performing, by the first boundary node, protection switching in the first protected domain.

With reference to the second aspect, in a first possible implementation manner, the first boundary node performs protection switching in the second protected domain. Optionally, before the first boundary node performs protection switching in the first protected domain, the first boundary node performs protection switching in the second protected domain; or when the first boundary node performs protection switching in the first protected domain, the first boundary node performs protection switching in the second protected domain; or after the first boundary node performs protection switching in the first protected domain, the first boundary node performs protection switching in the second protected domain.

With reference to the second aspect or the first possible implementation manner, in a second possible implementation manner, further, the first boundary node sends, in the second protected domain, a second APS message that carries a request of triggering inter-domain protection switching.

According to a third aspect, a network node is provided, including: a processing module, configured to: when it is detected that a first transport entity that is connected to the network node and in a first protected domain changes from a standby state to an active state, determine that in a second protected domain, there is only a protection transport entity that is connected to the first boundary node, and there is no working transport entity that is connected to the first boundary node; switch a service to a first protection transport entity, where the first protection transport entity is a transport entity that is connected to the network node and in the second protected domain; and generate a first automatic protection switching APS message that carries a request of triggering inter-domain protection switching; and a sending module, configured to send the first APS message by using the first protection transport entity.

With reference to the third aspect, in a first possible implementation manner, the request of triggering inter-domain protection switching is carried in a request and state field in the first APS message.

With reference to the first possible implementation manner of the third aspect, in a second possible implementation manner, the first APS message is used to trigger a second boundary node that receives the first APS message to: switch the service to the first protection transport entity; and after it is detected that in a third protected domain, there is only a protection transport entity that is connected to the second boundary node, perform protection switching in the third protected domain, and send a second APS message that carries a request of triggering inter-domain protection switching, where the second boundary node is both a boundary node of the second protected domain and a boundary node of the third protected domain.

With reference to the first and the second possible implementation manners of the third aspect, in a third possible implementation manner, the network node further includes a receiving module, configured to receive a third APS message that carries a request of triggering inter-domain protection switching and is sent by using the first transport entity; and the processing module is further configured to perform protection switching according to the third APS message to change the first transport entity from the standby state to the active state.

With reference to all possible implementation manners of the third aspect, in a fourth possible implementation manner, the network node further includes a receiving module, configured to receive a fourth APS message that is from the second protected domain and carries a request of notifying that an adjacent protected domain fails, where the fourth APS message further carries an identifier of the second boundary node; and the processing module is further configured to determine, according to the identifier, whether the second boundary node is a peer node of the network node, where the peer node of the network node refers to a boundary node that is both a boundary node of the first protected domain and a boundary node of the second protected domain; and if yes, perform protection switching to change the first transport entity from the standby state to the active state.

With reference to all possible implementation manners of the second aspect, the first protection transport entity is a transport entity with a highest priority among all available transport entities that are in the second protected domain and are connected to the network node.

According to a fourth aspect, a network node is further provided, including: a receiving module, configured to receive a first automatic protection switching APS message that is from a second protected domain and carries a request of notifying that an adjacent protected domain fails, where the first APS message further carries an identifier of a second boundary node; and a processing module, configured to, after it is identified according to the identifier that the second boundary node is a peer node of the network node, perform protection switching in the first protected domain, where the peer node of the network node refers to a node that is both a boundary node of the first protected domain and a boundary node of the second protected domain.

Further, the processing module is further configured to, after it is identified according to the identifier that the second boundary node is the peer node of the network node, perform protection switching in the second protected domain.

According to a fifth aspect, a network system is provided, including: the network node provided by the third aspect and a second boundary node, where the second boundary node is configured to receive a first automatic protection switching APS message sent by the network node by using a first protection transport entity, and switch a service to the first protection transport entity.

In a first possible implementation manner with reference to the fifth aspect, the second boundary node is further configured to, after it is detected that in a third protected domain, there is only a protection transport entity that is connected to the second boundary node, perform protection switching in the third protected domain, and send a second APS message that carries a request of triggering inter-domain protection switching, where the second boundary node is both a boundary node of the second protected domain and a boundary node of the third protected domain.

According to a sixth aspect, a network system is further provided, including: the network node provided by the fourth aspect and a second boundary node. The second boundary node is configured to, when it is detected that all transport entities that are connected to the second boundary node and in a first protected domain become faulty, generate a first automatic protection switching APS message that carries a request of notifying that an adjacent protected domain fails, and send the first APS message in a second protected domain, where the first APS message further carries an identifier of the second boundary node, and the second boundary node is a boundary node that is both a boundary node of the first protected domain and a boundary node of the second protected domain.

According to a protection switching method, network node, and system that are provided by embodiments of the present invention, when protection switching occurs in a protected domain, and when it is determined that there is only a protection transport entity in an adjacent domain, a boundary node performs protection switching in the adjacent protected domain, and simultaneously sends an APS message that carries a request of triggering inter-domain protection switching, so as to trigger a node that receives the APS message to perform protection switching, so that protection switching can be performed in chain, thereby implementing end-to-end protection switching and enhancing robustness of a protection network. In addition, when receiving an APS message of notifying that an adjacent protected domain fails, a boundary node initiates protection switching, so as to effectively implement protection switching in a unidirectional protection network.

BRIEF DESCRIPTION OF DRAWINGS

To describe the technical solutions in the embodiments of the present invention or in the prior art more clearly, the following briefly introduces the accompanying drawings required for describing the embodiments or the prior art. Apparently, the accompanying drawings in the following description show some embodiments of the present invention, and a person of ordinary skill in the art may still derive other drawings from these accompanying drawings without creative efforts.

FIG. 3 shows a value and a corresponding meaning that are filled in a payload area of an APS message;

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

Figure 1:
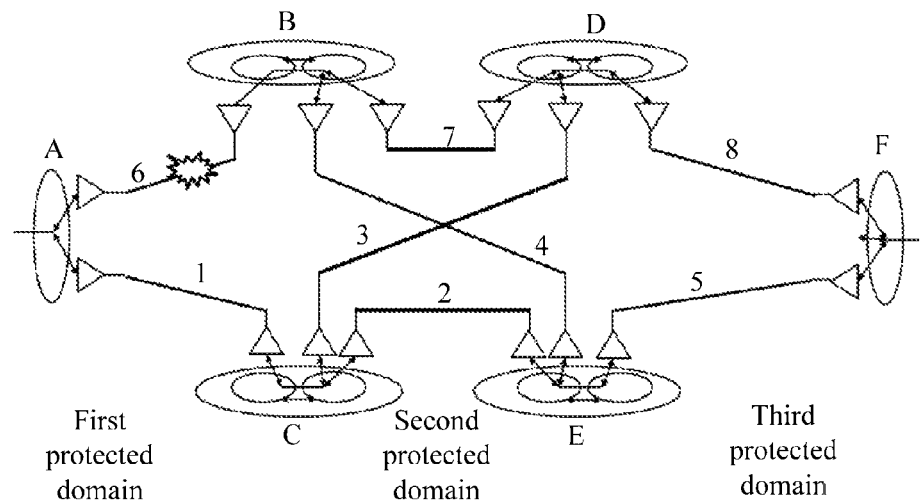
FIG. 1 is a network architecture diagram of a protection network in the prior art.
Figure 2:
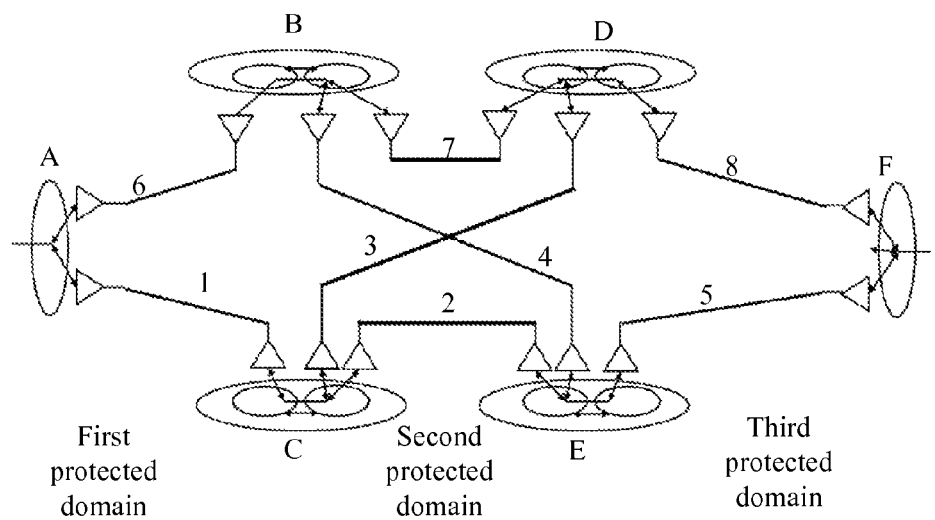
FIG. 2 is a network architecture diagram of a protection network that may be applied in an embodiment of the present invention.

FIG. 2 is a network structure diagram of an existing protection structure, and a protection switching method, node, and system that are provided by embodiments of the present invention can be applied to the network structure.

As shown in FIG. 2, nodes A, B, C, D, E, and F constitute a linear protection structure from A to F. These nodes have functions of bridging (bridge) and selection (selector), and specifically may be but not limited to an Ethernet transmission device and an optical transmission network device. Communication can be performed between connected nodes, and a specific communication manner is not limited in an embodiment of the present invention. A connection between nodes may be direct, or may be indirect; for example, another node, transport entity, or component (none of which is shown in FIG. 2) may be connected between the nodes. These intermediate nodes may transmit a service and an APS message among the nodes according to a selected path; optionally, a manner for transmitting the APS message may be transparent transmission, or may be forwarding, or may be reconstruction of a corresponding APS message.

A connection between adjacent nodes, for example, between A and B, between B and D, and between D and F may be a single unprotected connection, or may be a protected connection. For example, a connection between A and B may be a 1:1 protection structure (not shown in FIG. 2).

As shown in FIG. 2, the nodes A, B, and C are located in a first protected domain; the nodes B, C, D, and E are located in a second protected domain; and the nodes D, E, and F are located in a third protected domain. According to standard ITU-T G.870 of the ITU-T for ITU Telecommunication Standardization Sector and another relevant standard, a so-called protected domain (protected domain, also called a protection domain sometimes) refers to a survivability mechanism or a protection entirety. A protected domain includes one or more transport entities. When a fault occurs in a network, and the one or more transport entities in the protected domain are affected, the protected domain provides more robust survivability for a service running on these transport entities. The protected domain may be divided according to multiple criteria, for example, based on different management domains, and corresponding protection is provided by using a same or different network layers; for another example, based on different operator networks; for another example, according to networks that are based on different communication protocols; and for another example, based on a specific connection relationship between communications networks.

As shown in FIG. 2, the nodes B and C are nodes in both the first protected domain and the second protected domain, and moreover are boundary nodes of the two protected domains; the nodes D and E are nodes in both the second protected domain and the third protected domain, and moreover are boundary nodes of the two protected domains. A boundary node refers to a node at a boundary of a protected domain, and the boundary node can exchange a message with nodes in two or more protected domains simultaneously, thereby implementing message communication among protected domains.

It can be seen that, the boundary node can not only perform message communication with another node in the protected domain, but also undertake a task of message communication between the protected domain and a node outside the protected domain.

In addition, because the node B and the node C are the boundary nodes of both the first protected domain and the second protected domain, the node B and the node C may be configured as peer nodes, so as to protect a service between them. Likewise, because the node D and the node E are the boundary nodes of both the second protected domain and the third protected domain, the node D and the node E may be configured as peer nodes, so as to protect a service between them. Generally, two peer nodes are boundary nodes of two same protected domains simultaneously; for example, the peer nodes B and C are boundary nodes belonging to both the first protected domain and the second protected domain, and may be configured as peer nodes. Peer nodes are mutual; for example, B is a peer node of C, that is, C is also a peer node of B. Specifically, in an application, a peer node may be configured during networking, or may be configured by using a command line of a device or by using network management permission, and how to configure the peer node specifically is not limited in this embodiment. After a peer node is configured for a boundary node, when the node or a transport entity connected to the node becomes faulty, the peer node of the node can undertake a task of message communication between two protected domains in which the node is located, thereby playing a role in protecting a service of the boundary node, which can enhance robustness of a protection network.

In the network structure described above, service protection may be performed by using a linear protection mechanism. In a linear protection structure, except a 1+1 single-ended protection structure, other protection structures such as a 1:1 unidirectional protection structure, a 1:1 bidirectional protection structure, and a 1+1 bidirectional protection structure all need to synchronize protection switching at a source end and a sink end by using an APS packet.

Table 1 shows a format of the APS packet. The APS packet (or an APS protocol data unit) is a type of an Ethernet operation, administration and maintenance protocol data unit. In Table 1, MEL is used to identify a maintenance domain level; OpCode is used to mark a packet type (a value of the APS packet herein is 39); TLV Offset is used to identify start of a TLV field; and END TLV is used to identify end of the TLV field, where the TLV field is used to carry specific information of APS.

TABLE 1

| 1 | 2 | 3 | 4 |
|---|---|---|---|
| 8 7 6 5 4 3 2 1 | 8 7 6 5 4 3 2 1 | 8 7 6 5 4 3 2 1 | 8 7 6 5 4 3 2 1 |
| MEL       Version (0) | OpCode (APS = 39) | Mark (0) | TLV Offset (4) |
| APS - specific information | | | |
| END TLV (0) | | | |

Table 2 shows a specific format of APS—specific information in Table 1. For definitions of all fields in Table 2, refer to FIG. 3.

TABLE 2

| 1 | 2 | 3 | 4 |
|---|---|---|---|
| 8 7 6 5 4 3 2 1 | 8 7 6 5 4 3 2 1 | 8 7 6 5 4 3 2 1 | 8 7 6 5 4 3 2 1 |
| Request/ State | Protection Type  A B D R | Requested Signal | Bridged Signal         Reserved |

The following provides more detailed description of the present invention with reference to specific cases.

Embodiment 1

Figure 4:
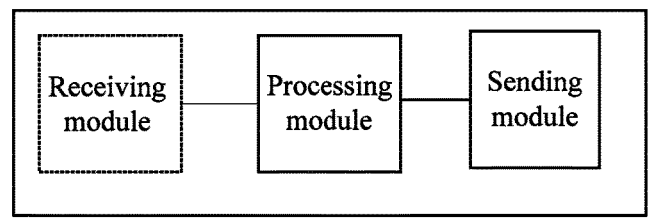
FIG. 4 is a schematic structural diagram of a network node in Embodiment 1 of the present invention.

As shown in FIG. 4, an embodiment of the present invention provides a network node. The network node includes: a processing module, configured to: when it is detected that a first transport entity that is connected to the network node and in a first protected domain changes from a standby state to an active state, determine that in a second protected domain, there is only a protection transport entity that is connected to the first boundary node, and there is no working transport entity that is connected to the first boundary node; switch a service to a first protection transport entity, where the first protection transport entity is a transport entity that is connected to the network node and in the second protected domain; and generate a first automatic protection switching APS message that carries a request of triggering inter-domain protection switching; and a sending module, configured to send the first APS message by using the first protection transport entity.

Specifically, the network node may be applied to the network framework described above, and used as a boundary node of a protected domain; for example, used as a node B or C in FIG. 2. The network node may be used as both a boundary node of a first protected domain and a boundary node of a second protected domain.

For example, in FIG. 2, when an original active (active) transport entity 6 between A and F becomes faulty, a service needs to be switched to a standby (standby) transport entity 1, and the transport entity 1 changes from the standby state to the active state. In this scenario, the foregoing first transport entity is the transport entity 1. In a switching process, the node A sends a switching request, for example, sends a signal fail SF request, and the node C performs protection switching after receiving the corresponding request. The foregoing processing module may be configured to perform corresponding protection switching, and may be configured to detect the active or standby state of the transport entity 1. There may be multiple means of detecting that the transport entity 1 changes from the standby state to the active state. For example, the network node receives an SF request from a transport entity, and finally selects the transport entity 1 to receive a service. Then, it may be considered that it has been detected that the transport entity 1 changes from standby to active. Specific means of detecting the active or standby state may use the prior art, and may be various, which is not limited in this embodiment.

In the linear protection structure or protection network described above, during networking, one working transport entity is configured in each domain, and one or more protection transport entities may be configured in each domain. For example, in FIG. 2, transport entities 6, 7, and 8 are working transport entities of a first protected domain, a second protected domain, and a third protected domain, respectively; and transport entities 1, 2, 3, 4, and 5 are configured as protection transport entities.

The processing module may be configured to determine that in the second protected domain, there is only a protection transport entity that is connected to the first boundary node, and there is no working transport entity that is connected to the first boundary node. With reference to FIG. 2, that the network node is the node C is used as an example. When the transport entity 1 (that is, the first transport entity) changes from standby to active, a processing module of the node C may be configured to determine that in an adjacent protected domain, there is only a protection transport entity and no working transport entity that is connected to C. Specifically, that is, it is determined whether the transport entities 2 and 3 are both protection transport entities. Correspondingly, the processing module may determine whether a transport entity is a protection transport entity or a working transport entity according to a stored port identifier, and then determines whether transport entities that are connected to the network node are all protection transport entities. Certainly, the processing module may also perform the determining in another manner. For example, the network node may be configured as a protection node that is used to protect a service of a corresponding working node in a network. When the network node is configured as the protection node, it may be considered by default that all transport entities that are in a domain and are connected to the node are protection transport entities, and correspondingly, confirming that the network node is a protection node may be equivalent to a process of confirming that all transport entities that are connected to the network node are protection transport entities. For another example, the processing module may perform identification according to an identifier of a physical link or a logical link in which a transport entity is located, or may perform confirmation according to received signaling. It should be noted that, the processing module determines, after it is detected that the transport entity in the first protected domain changes from standby to active, that in an adjacent domain, that is, in the second protected domain, there is only a protection transport entity that is connected to a network node on which the processing module is located.

Optionally, the processing module may further be configured to, when it is found or detected that in an adjacent domain, there is a working transport entity that is connected to a network node on which the processing module is located, simply bridge a service that is from the first transport entity to the corresponding working transport entity. For example, if the node C in FIG. 2 finds that a transport entity 3 connected to the node C is a working transport entity, the node C may directly switch a service to the corresponding working transport entity 3 when finding that the transport entity 1 changes from standby to active.

The processing module may further be configured to switch the service to the first protection transport entity, and generate a first automatic protection switching APS message that carries a request of triggering inter-domain protection switching, so that the sending module sends the first APS message by using the first protection transport entity. The first automatic protection switching APS message that carries the request of triggering inter-domain protection switching may be an APS message that carries protection path signal fail (SF-P), may be an APS message for forced switching, or may be another APS message that can be used to trigger switching. The processing module may first switch the service to the first protection transport entity, and then generate the first automatic protection switching APS message that carries the request of triggering inter-domain protection switching, so that the sending module sends the first APS message by using the first protection transport entity. Optionally, it may also be that, the processing module first generates the first automatic protection switching APS message that carries the request of triggering inter-domain protection switching, so that the sending module sends the first APS message by using the first protection transport entity, and then switches the service to the first protection transport entity.

Preferably, in this embodiment, a new APS request message is defined by extending an APS message type. A request command of such an APS message that carries a request of triggering inter-domain protection switching may be carried in a request and state (that is, request/state, request/state in the first column of Table 2) field shown in Table 2. Specifically, with reference to FIG. 3, a value filled in the request command may be reserved 0011, 1010, 1100, 1000, or the like; and in a case in which another value is available, the another value may also be used, which is not limited in this embodiment.

Specifically to the network node in this embodiment, the extended APS message, that is, the first APS message, may be used to trigger a second boundary node that receives the first APS message to: switch the service to the first protection transport entity; and after it is detected that in a third protected domain, there is only a protection transport entity that is connected to the second boundary node, perform protection switching in the third protected domain, and send a second APS message that carries a request of triggering inter-domain protection switching, where the second boundary node is both a boundary node of the second protected domain and a boundary node of the third protected domain. It should be noted that, after receiving the corresponding first APS message, an intermediate node, which is a non-boundary node, may directly perform transparent transmission; or may perform corresponding forwarding; or may newly construct a same or different APS message. In a word, an APS message that is transmitted downstream can trigger a corresponding boundary node to perform switching.

Specifically, in one aspect, the extended APS message has a function similar to forced switching or manual switching, and is used to trigger a node that receives the message to perform protection switching, where a priority of the APS message may be set according to a specific requirement, which is not described in detail in this embodiment. In another aspect, when triggering a receiving node to perform protection switching, the extended APS message also triggers the node to detect whether there is only a protection transport entity in an adjacent domain; and when it is detected that in the adjacent domain, there is only a protection transport entity, and there is no working transport entity, the node proceeds with switching, and continues to send the second APS message that carries the request of triggering inter-domain protection switching, so as to trigger a subsequent link to perform necessary protection switching.

Optionally, the network node further includes a receiving module, configured to receive a third APS message that carries a request of triggering inter-domain protection switching and is sent by using the first transport entity; and the processing module is further configured to perform protection switching according to the third APS message to change the first transport entity from the standby state to the active state; or optionally, the network node further includes a receiving module, configured to receive a fourth APS message that is from the second protected domain and carries a request of notifying that an adjacent protected domain fails, where the fourth APS message further carries an identifier of the second boundary node; and the processing module is further configured to determine, according to the identifier, whether the second boundary node is a peer node of the network node, where the peer node of the network node refers to a boundary node that is both a boundary node of the first protected domain and a boundary node of the second protected domain.

As shown in FIG. 2, the nodes B and C may be set as peer nodes for each other. When finding that the transport entity 6 becomes faulty, the node B may send, by using a transport entity in the second protected domain, a fourth APS message that carries a request of notifying that an adjacent protected domain fails, so as to notify that a transport entity that is connected to the node B and in the first protected domain becomes faulty. After receiving the fourth APS message, the nodes D and E in the second protected domain find that the fourth APS message is an APS message that notifies that an adjacent protected domain fails, and the message carries the identifier of the second boundary node (which is the node B in this example); and find, according to identifier information of a peer node of a local node that is stored by the local node, that the identifier carried in the fourth APS message does not match the stored identifier information of the peer node of the local node, which indicates that the fourth APS message is not sent by the peer node of the local node, and then forward the fourth APS message in the second protected domain. For example, after receiving the fourth APS message that is from the transport entity 7, the node D finds that the fourth APS message is not sent by a peer node, and then forwards the fourth APS message through the transport entity 3.

The peer node C of the node B receives the fourth APS message that is from the second protected domain by using the receiving module, and finds that the fourth APS message is a fourth APS message that carries a request of notifying that an adjacent protected domain fails, and then determines, according to an identifier carried in the message, whether a second boundary node that sends the message is a peer node of the peer node C. If it is found that the identifier can match an identifier of a peer node stored by the local node, it indicates that a node that sends the fourth APS message is the peer node of the local node. Two nodes that are peer nodes for each other refer to two nodes that are boundary nodes of two same protected domains simultaneously, and such two nodes may be configured as peer nodes during networking configuration. In a process of configuring a peer node, a local node stores an identifier of the peer node. A specific type of the identifier of the peer node may be a node number, a corresponding IP address, a physical port identifier, or the like, which is not limited in this embodiment.

Another alternative solution is that, the foregoing fourth APS message may carry the identifier of the second boundary node. The nodes in FIG. 2 are used as an example. If the node B is the second boundary node, when finding that the transport entity 6 becomes faulty, the node B sends the fourth APS message, where the message carries an identifier of the peer node C of the node B. Correspondingly, another node in the second protected domain may determine, according to a node identifier of the another node, whether the another node is a peer node of a node that sends the fourth APS message. After receiving the fourth APS message by using the receiving module, the node C determines, by using a node identifier of the node C, whether the second boundary node that sends the fourth APS message is a peer node of the local node.

The fourth APS message described above is a new type of APS message, and is used by a node to notify a peer node that a communication function of the node fails in a domain. A request of notifying that an adjacent protected domain fails may be carried in a column of request and state (request/state, request/state) provided in Table 2. Specifically, a value filled in a request command may be reserved 0011, 1010, 1100, 1000, or the like; and in a case in which another value is available, the another value may also be used, which is not limited in this embodiment. It should be noted that, a value filled herein is not duplicate with a value in the foregoing first APS message. In addition, the identifier carried in the fourth APS message may be carried at another position that is in the APS message and may be used to carry an identifier; for example, may be carried in a reserved field as listed in Table 1, which is not limited in this embodiment.

Further, the foregoing processing module of the network node is further configured to, when it is determined that the second boundary node is the peer node of the network node, perform protection switching to change the first transport entity from the standby state to the active state. Specifically to FIG. 2, after receiving a fourth APS message of the peer node B, the processing module of the node C determines, according to an identifier carried in the message, that the node B is a peer node of the node C. Because the message is from the second protected domain, which indicates that a transport entity that is connected to the node B and in the first protected domain is faulty, the processing module of the node C then performs switching in the first protected domain to change the first transport entity (the transport entity 1 in FIG. 2) from the standby state to the active state.

Certainly, the processing module of the network node is further configured to, when it is determined that the second boundary node is not the peer node of the network node, send the fourth APS message to the sending module; and the sending module is further configured to forward the fourth APS message in the second protected domain. Specifically to FIG. 2, after receiving a fourth APS message of the peer node B, a processing module of the node E determines, according to an identifier carried in the message, that the node B is not a peer node of the node E, and sends the fourth APS message to the sending module. The sending module forwards the fourth APS message in the second protected domain, for example, forwards the fourth APS message by using a transport entity 2. It should be noted that, when receiving an APS message that carries a request of notifying that an adjacent protected domain fails, an intra-domain intermediate node, which is a non-boundary node, may directly perform transparent transmission, or may perform forwarding.

Further, when finding that there are multiple protection transport entities available for switching, the network node may randomly select a protection transport entity to perform switching; or may select, according to a rule, a protection transport entity to perform switching; and more preferably, may select a protection transport entity with a highest priority to perform switching. Certainly, if the protection transport entity with the highest priority has delivered an alarm, a corresponding protection transport entity with a second highest priority is selected. Specifically to FIG. 2, after finding that the transport entity 1 changes from standby to active, the processing module of the network node C finds that there are only the transport entities 2 and 3 in the second protected domain, then selects the transport entity 3 with a higher priority from the transport entities 2 and 3 (that is, selects the transport entity 3 as the first protection transport entity), and switches a service from the transport entity 1 to the transport entity 3 and sends a first APS message that carries a request of triggering inter-domain protection switching. If an alarm appears on the transport entity 1, the transport entity 2 with a second highest priority is selected.

Figure 5:
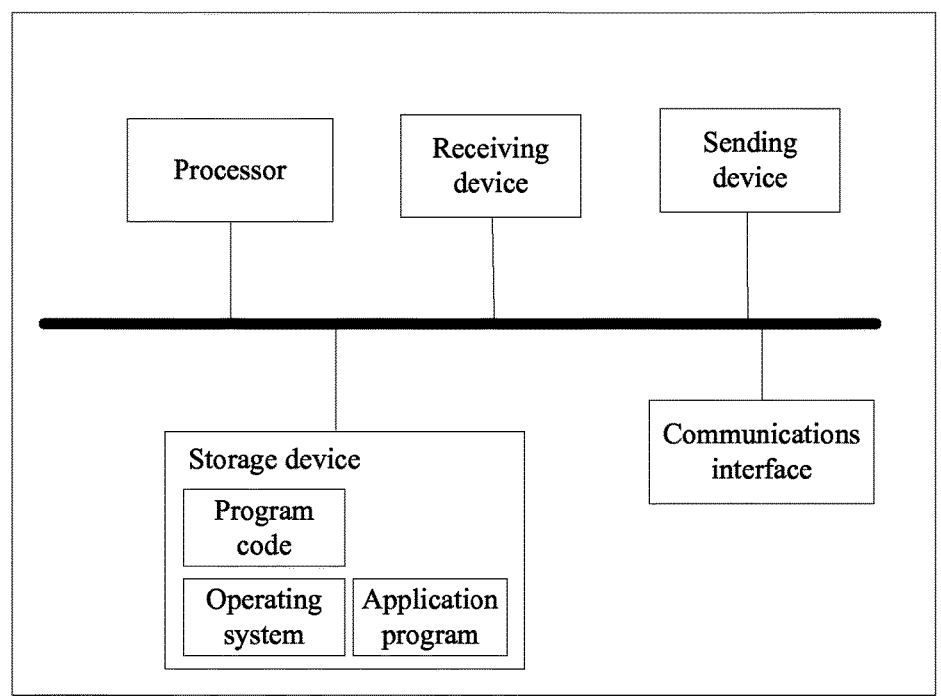
FIG. 5 is a schematic structural diagram of a network node in Embodiment 1 of the present invention.

In a scenario, the foregoing processing module of the network node may be specifically a processor shown in FIG. 5, the sending module is a sending device shown in FIG. 5, and the receiving module is a receiving device shown in FIG. 5, where the three are connected by using a communications interface. The processor is configured to implement a function of the foregoing processing module. Specifically, a corresponding processing function may be built into corresponding hardware. For example, the processor may be specifically embodied as an available field programmable gate array (Field Programmable Gate Array, FPGA).

In another scenario, the foregoing processing module of the network node includes a processor and a storage device in FIG. 5. The storage device may store corresponding program code, operating system, and application program; and the processor is configured to execute the program code in the storage device, and when the program code is executed, the processor may implement a function of the foregoing processing module.

The network node provided in this embodiment may be applied to a 1:1 protection mechanism, and may also be applied to a 1+1 protection mechanism.

According to a network node provided by this embodiment of the present invention, when protection switching occurs in a protected domain, and when it is determined that there is only a protection transport entity in an adjacent domain, the network node performs protection switching in the adjacent protected domain, and simultaneously sends an APS message that carries a request of triggering inter-domain protection switching, so as to trigger a node that receives the APS message to perform protection switching, so that protection switching can be performed in chain, thereby implementing end-to-end protection switching and enhancing robustness of a protection network.

Embodiment 2

Figure 6:
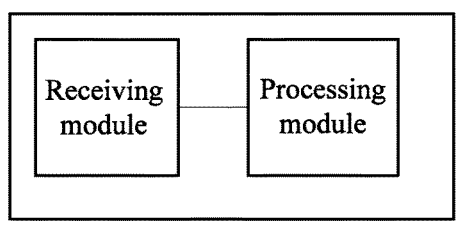
FIG. 6 is a schematic structural diagram of a network node in Embodiment 2 of the present invention.

As shown in FIG. 6, this embodiment provides another network node, where the network node is a boundary node of both a first protected domain and a boundary node of a second protected domain. The network node includes: a receiving module, configured to receive a first automatic protection switching APS message that is from a second protected domain and carries a request of notifying that an adjacent protected domain fails, where the first APS message further carries an identifier of a second boundary node; and a processing module, configured to, after it is identified according to the identifier that the second boundary node is a peer node of the network node, perform protection switching in the first protected domain, where the peer node of the network node refers to a node that is both a boundary node of the first protected domain and a boundary node of the second protected domain.

The network node may be applied to the network structure in FIG. 2. Nodes B and C may be set to be peer nodes for each other. When finding that a transport entity 6 becomes faulty, the node B may send, by using a transport entity in a second protected domain, a first APS message that carries a request of notifying that an adjacent protected domain fails (the first APS message in this embodiment is similar to the fourth APS message in Embodiment 1), so as to notify that a transport entity that is connected to the node B and in a first protected domain becomes faulty. After receiving the first APS message, nodes D and E in the second protected domain find that the first APS message is an APS message that notifies that an adjacent protected domain fails, and the message carries the identifier of the second boundary node (which is the node B in this example); and find, according to identifier information of a peer node of a local node that is stored by the local node, that the identifier carried in the first APS message does not match the stored identifier information of the peer node of the local node, which indicates that the first APS message is not sent by the peer node of the local node, and then forward the first APS message in the second protected domain. For example, after receiving a first APS message that is from a transport entity 7, the node D finds that the first APS message is not sent by a peer node, and then forwards the first APS message through a transport entity 3.

The peer node C of the node B receives a first APS message that is from the second protected domain by using the receiving module, and finds that the first APS message is a first APS message that carries a request of notifying that an adjacent protected domain fails, and then identifies, according to an identifier carried in the message, whether a second boundary node that sends the message is a peer node of the peer node C. If it is found that the identifier can match an identifier of a peer node stored by the local node, it indicates that a node that sends the first APS message is the peer node of the local node. Two nodes that are peer nodes for each other refer to two nodes that are boundary nodes of two same protected domains simultaneously, and such two nodes may be configured as peer nodes during networking configuration. In a process of configuring a peer node, a local node stores an identifier of the peer node. A specific type of the identifier of the peer node may be a node number, a corresponding IP address, a physical port identifier, or the like, which is not limited in this embodiment.

Another alternative solution is that, the foregoing first APS message may carry the identifier of the second boundary node. The nodes in FIG. 2 are used as an example. If the node B is the second boundary node, when finding that the transport entity 6 becomes faulty, the node B sends the first APS message, where the message carries an identifier of the peer node C of the node B. Correspondingly, another node in the second protected domain may identify, according to a node identifier of the another node, whether the local node is a peer node of a node that sends the first APS message. After receiving the first APS message by using the receiving module, the node C identifies, by using a node identifier of the node C, whether the second boundary node that sends the first APS message is a peer node of the local node.

The first APS message described above is a new type of APS message, and is used by a node to notify a peer node that a communication function of the node fails in a domain. A request of notifying that an adjacent protected domain fails may be carried in a column of request and state (request/state, request/state) provided in Table 2. Specifically, a value filled in a request command may be reserved 0011, 1010, 1100, 1000, or the like; and in a case in which another value is available, the another value may also be used, which is not limited in this embodiment. In addition, the identifier carried in the first APS message may be carried at another position that is in the APS message and may be used to carry an identifier; for example, may be carried in a reserved field in Table 1, which is not limited in this embodiment.

Further, the foregoing processing module of the network node is further configured to, when it is identified that the second boundary node is the peer node of the network node, perform protection switching to change the first transport entity from a standby state to an active state. Specifically to FIG. 2, after receiving a first APS message of the peer node B, a processing module of the node C identifies, according to an identifier carried in the message, that the node B is a peer node of the node C. Because the message is from the second protected domain, which indicates that a transport entity that is connected to the node B and in the first protected domain is faulty, the processing module of the node C then performs switching in the first protected domain to change the first transport entity (the transport entity 1 in FIG. 2) from the standby state to the active state.

The processing module is further configured to, after it is identified, according to the identifier, that the second boundary node is the peer node of the network node, perform protection switching in the second protected domain to bridge a service that is from the first protected domain to a protection transport entity in the second protected domain; and may further be configured to send, through the protection transport entity, a second APS message that carries a request of triggering inter-domain protection switching, so as to trigger a corresponding node in a protection network to perform switching in chain, thereby implementing end-to-end protection switching. The second APS message that carries the request of triggering inter-domain protection switching in this embodiment may be the APS message that carries the request of triggering inter-domain protection switching in the embodiment, and details are not described herein again.

Certainly, the processing module of the network node is further configured to, when it is identified that the second boundary node is not the peer node of the network node, send the first APS message to the sending module; and the sending module is further configured to forward the first APS message in the second protected domain. Specifically to FIG. 2, after receiving a first APS message of the peer node B, a processing module of a node E identifies, according to an identifier carried in the message, that the node B is not a peer node of the node E, and sends the first APS message to the sending module. The sending module forwards the first APS message in the second protected domain, for example, forwards the first APS message by using a transport entity 2.

Figure 7:
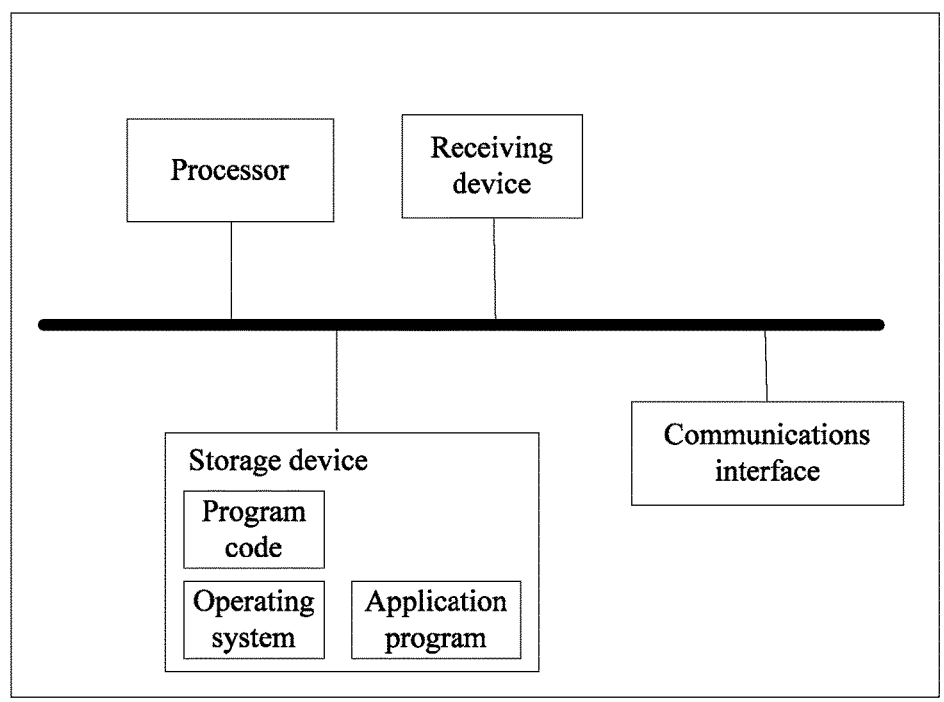
FIG. 7 is a schematic structural diagram of a network node in Embodiment 2 of the present invention.

In a scenario, the foregoing processing module of the network node may be specifically a processor in FIG. 7, and the receiving module is a receiving device shown in FIG. 7, where the two are connected by using a communications interface. The processor is configured to implement a function of the foregoing processing module. Specifically, a corresponding processing function may be built into corresponding hardware. For example, the processor may be specifically embodied as an available field programmable gate array (Field Programmable Gate Array, FPGA).

In another scenario, the foregoing processing module of the network node includes a processor and a storage device in FIG. 5. The storage device may store corresponding program code, operating system, and application program; and the processor is configured to execute the program code in the storage device, and when the program code is executed, the processor may implement a function of the foregoing processing module.

The network node provided in this embodiment may be applied to a 1:1 protection mechanism, and may also be applied to a 1+1 protection mechanism.

According to a network node provided by this embodiment, a request message that is from a second protected domain and notifies that an adjacent domain fails is received, and it is identified, according to an identifier carried in the message, that the message is sent by a peer node, thereby knowing that the peer node fails in a first protected domain; then, protection switching is initiated in the first protected domain, which enhances robustness of inter-domain service protection. Further, switching is also initiated in the second protected domain, and an APS message is sent to trigger a next protected domain to perform necessary switching, which can ensure implementation of end-to-end protection switching.

Embodiment 3

Figure 8:
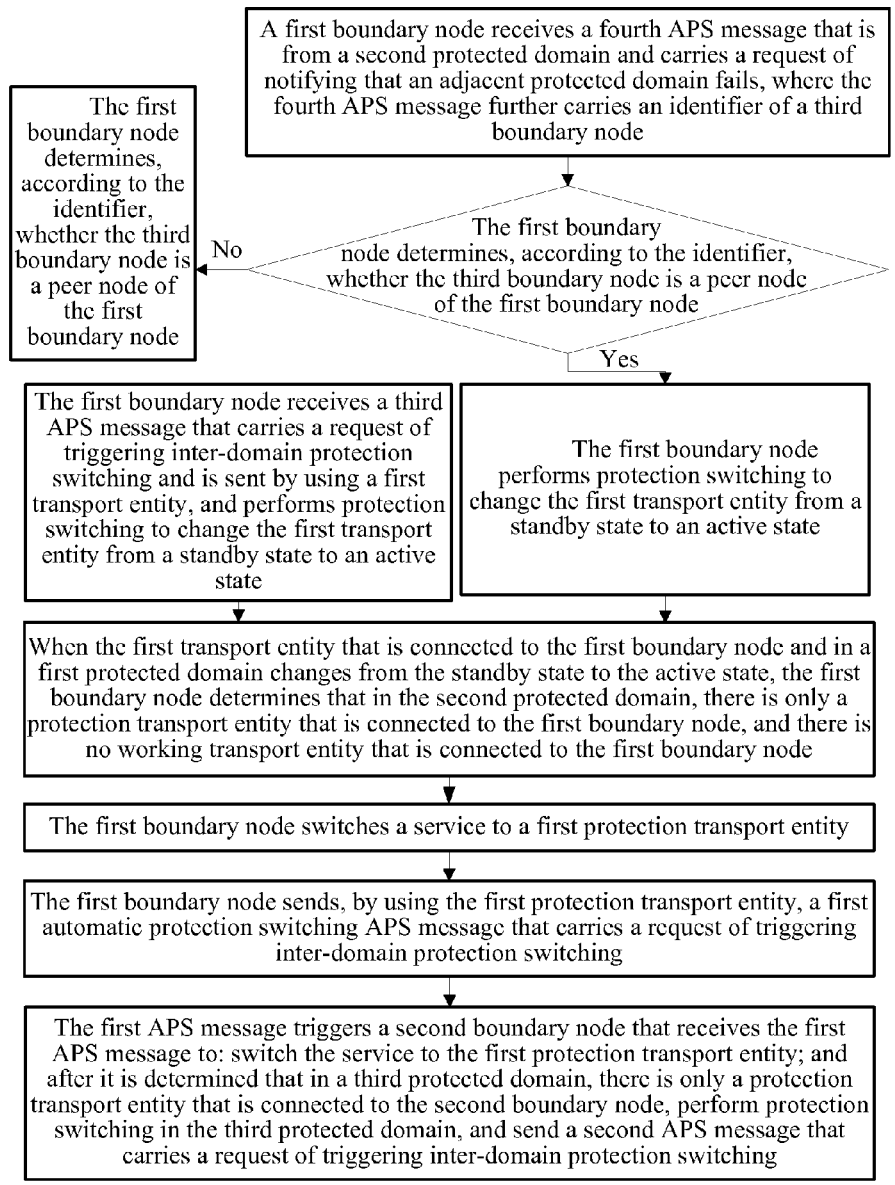
FIG. 8 is a method flowchart of a protection switching method in Embodiment 3 of the present invention.

As shown in FIG. 8, this embodiment of the present invention provides a protection switching method, where the method may use the network node provided in Embodiment 1, and may be applied to the network structure shown in FIG. 2.

The method includes: when a first transport entity that is connected to a first boundary node and in a first protected domain changes from a standby state to an active state, determining, by the first boundary node, that in a second protected domain, there is only a protection transport entity that is connected to the first boundary node, and there is no working transport entity that is connected to the first boundary node, where the first boundary node is both a boundary node of the first protected domain and a boundary node of the second protected domain; switching, by the first boundary node, a service to a first protection transport entity, where the first protection transport entity is a transport entity that is connected to the first boundary node and in the second protected domain; and sending, by the first boundary node by using the first protection transport entity, a first automatic protection switching APS message that carries a request of triggering inter-domain protection switching. It should be noted that, an execution sequence of the switching, by the first boundary node, a service to a first protection transport entity, and the sending, by the first boundary node by using the first protection transport entity, a first automatic protection switching APS message that carries a request of triggering inter-domain protection switching may be exchanged (not shown in FIG. 8), which is not limited in this embodiment.

Optionally, the request of triggering inter-domain protection switching may be carried in a request and state field in the first APS message.

The first APS message may be used to trigger a second boundary node that receives the first APS message to: switch the service to the first protection transport entity; and after it is determined that in a third protected domain, there is only a protection transport entity that is connected to the second boundary node, perform protection switching in the third protected domain, and send a second APS message that carries a request of triggering inter-domain protection switching, where the second boundary node is both a boundary node of the second protected domain and a boundary node of the third protected domain.

Optionally, it may be a third APS message that carries a request of triggering inter-domain protection switching that triggers the first boundary node to change the first transport entity from the standby state to the active state. Specifically, the first boundary node receives the third APS message that carries the request of triggering inter-domain protection switching and is sent by using the first transport entity; and performs protection switching to change the first transport entity from the standby state to the active state.

Optionally, it may be a fourth APS message that carries a request of notifying that an adjacent protected domain fails that triggers the first boundary node to change the first transport entity from the standby state to the active state. Specifically, the first boundary node receives a fourth APS message that is from the second protected domain and carries a request of notifying that an adjacent protected domain fails, where the fourth APS message further carries an identifier of a third boundary node; and the first boundary node determines, according to the identifier, whether the third boundary node is a peer node of the first boundary node, where the peer node of the first boundary node refers to a node that is both a boundary node of the first protected domain and a boundary node of the second protected domain. Further, if a result of the determining is yes, the first boundary node performs protection switching to change the first transport entity from the standby state to the active state; or if the result of the determining is no, the first boundary node forwards the fourth APS message in the second protected domain.

The protection switching method provided in this embodiment may be applied to a 1:1 protection mechanism, and the first protection transport entity is a transport entity with a highest priority among all available transport entities that are in the second protected domain and are connected to the first boundary node.

This embodiment further provides a protection switching network system, and the network system includes the network node provided in Embodiment 1 and a second boundary node. The network system can use the protection switching method provided in this embodiment to provide end-to-end protection for a service borne in the network system. The second boundary node is configured to receive a first automatic protection switching APS message sent by the network node by using a first protection transport entity, and switch a service to the first protection transport entity. Further, the second boundary node is further configured to, after it is detected that in a third protected domain, there is only a protection transport entity that is connected to the second boundary node, perform protection switching in the third protected domain, and send a second APS message that carries a request of triggering inter-domain protection switching, where the second boundary node is both a boundary node of the second protected domain and a boundary node of the third protected domain.

According to a protection switching method and system that are provided by this embodiment of the present invention, when protection switching occurs in a protected domain, and when it is determined that there is only a protection transport entity in an adjacent domain, a network node performs protection switching in the adjacent protected domain, and simultaneously sends an APS message that carries a request of triggering inter-domain protection switching, so as to trigger a node that receives the APS message to perform protection switching, so that protection switching can be performed in chain, thereby implementing end-to-end protection switching and enhancing robustness of a protection network.

Embodiment 4

Figure 9:
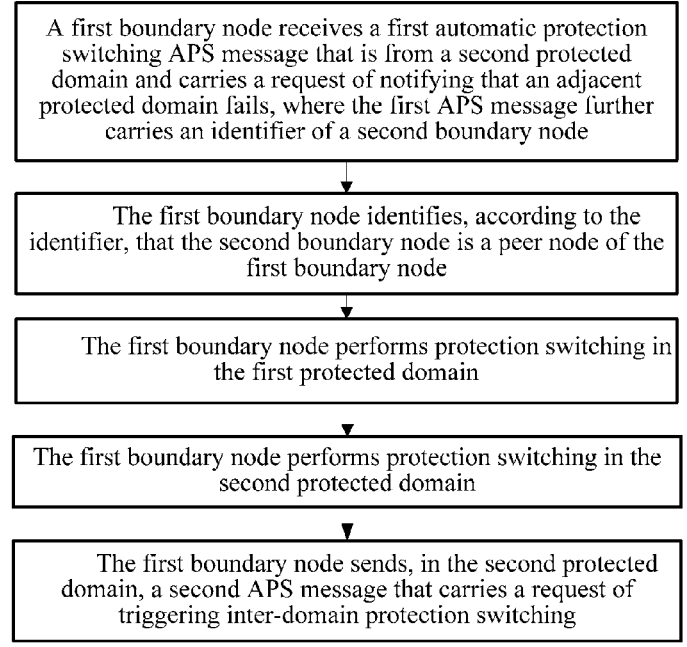
FIG. 9 is a method flowchart of a protection switching method in Embodiment 4 of the present invention.

As shown in FIG. 9, this embodiment further provides a protection switching method, where the method may use the network node provided in Embodiment 2, and may be applied to the network structure shown in FIG. 2.

The method includes: receiving, by a first boundary node, a first automatic protection switching APS message that is from a second protected domain and carries a request of notifying that an adjacent protected domain fails, where the first APS message further carries an identifier of a second boundary node, and the first boundary node is both a boundary node of a first protected domain and a boundary node of the second protected domain; and identifying, by the first boundary node according to the identifier, that the second boundary node is a peer node of the first boundary node, where the peer node of the first boundary node refers to a node that is both a boundary node of the first protected domain and a boundary node of the second protected domain.

For a specific method in which the first boundary node identifies, according to the identifier, that the second boundary node is the peer node of the first boundary node, reference may be made to the identification method or the determining method in Embodiments 1 and 2, and details are not described herein again. If the first boundary node identifies, according to the identifier, that the second boundary node is not the peer node of the first boundary node, the first boundary node forwards the received first APS message in the second protected domain.

Further, the first boundary node may further perform protection switching in the second protected domain. Specifically, before the first boundary node performs protection switching in the first protected domain, the first boundary node performs protection switching in the second protected domain; or when the first boundary node performs protection switching in the first protected domain, the first boundary node performs protection switching in the second protected domain; or after the first boundary node performs protection switching in the first protected domain, the first boundary node performs protection switching in the second protected domain.

Still further, the first boundary node sends, in the second protected domain, a second APS message that carries a request of triggering inter-domain protection switching. It should be noted that, there is no time sequence of operations that are after the first APS message is received and after it is identified that the second boundary node is the peer node; switching may be first initiated in the first protected domain, or switching may be initiated in the second protected domain; and a time point at which a corresponding second APS message is sent is not limited in this embodiment either.

This embodiment further provides a network system, where the network system includes the network node according to Embodiment 2 and a second boundary node. The second boundary node is configured to, when it is detected that all transport entities that are connected to the second boundary node and in a first protected domain become faulty, generate a first automatic protection switching APS message that carries a request of notifying that an adjacent protected domain fails, and send the first APS message in a second protected domain, where the first APS message further carries an identifier of the second boundary node, and the second boundary node is a boundary node that is both a boundary node of the first protected domain and a boundary node of the second protected domain.

According to a protection switching method and network system that are provided by this embodiment, a request message that is from a second protected domain and notifies that an adjacent domain fails is received, and it is identified, according to an identifier carried in the message, that the message is sent by a peer node, thereby knowing that the peer node fails in a first protected domain; then, protection switching is initiated in the first protected domain, which enhances robustness of inter-domain service protection. Further, switching is also initiated in the second protected domain, and an APS message is sent to trigger a next protected domain to perform necessary switching, which can ensure implementation of end-to-end protection switching.

The following further explains the present invention with reference to a specific scenario.

Embodiment 5

This embodiment provides a protection switching method in the case of dual link faults that occur in multiple protected domains.

Figure 10:
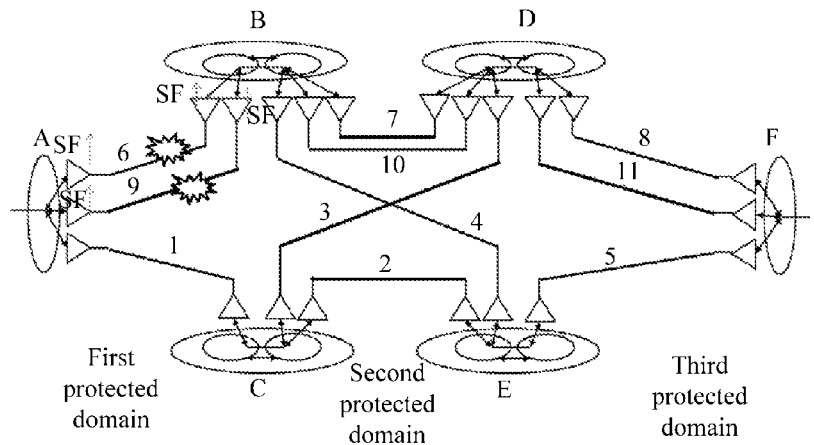
FIG. 10 is a network architecture diagram of a protection network that may be applied in Embodiments 5 and 8 of the present invention.

As shown in FIG. 10, nodes B, C, D, and E are configured as boundary nodes. A protection mode of each node is configured as a 1:1 bidirectional protection mechanism. Transport entities 6, 7, and 8 are respectively configured as working transport entities of a first protected domain, a second protected domain, and a third protected domain. Correspondingly, transport entities 1 and 9 are configured as protection transport entities of the working transport entity 6; transport entities 2, 3, 4, and 10 are configured as protection transport entities of the working transport entity 7; and transport entities 5 and 11 are configured as protection transport entities of the working transport entity 8. When the working transport entity 6 and the protection transport entity 9 in the first protected domain become faulty simultaneously, nodes A and B both may detect a signal fail (signal fail, SF) signal, and then corresponding switching needs to be performed.

Specifically, in the first protected domain, the nodes A and C exchange an APS protocol, and switching to the transport entity 1 is implemented.

The node C performs protection switching in the first protected domain. When determining that the transport entities 2 and 3 that exist in the second protected domain are both protection transport entities, and there is no working transport entity, the node C selects the transport entity 2 or 3 to initiate protection switching in the second protected domain.

If the node C selects the transport entity 3 to initiate protection switching in the second protected domain, the node C sends an APS message to the node D by using the transport entity 3, where message content is "triggering inter-domain protection switching", and simultaneously switches a service to the transport entity 3. After receiving the APS message of C, the node D receives a normal service from the transport entity 3 and sends the normal service, and sends an APS message to the node C to confirm the switching. The node D performs protection switching in the second protected domain, and finds that the working transport entity 8 exists in the third protected domain, and then the node D selects the working transport entity 8 to receive and send the service. No protection switching occurs in the third protected domain.

If the node C selects the transport entity 2 to initiate protection switching in the second protected domain, the node C sends an APS message to the node E by using the transport entity 2, where message content is "triggering inter-domain protection switching", and simultaneously switches a service to the transport entity 2. After receiving the APS message of the node C, the node E receives a normal service from the transport entity 2 and sends the normal service, and sends an APS message to the node C. The node E performs protection switching in the second protected domain, and determines that the transport entity 5 that exists in the third protected domain is a protection path, and then the node E sends an APS message to a node F by using the transport entity 5, where message content is "triggering inter-domain protection switching", and simultaneously switches the normal service to the transport entity 5. After receiving the APS message of the node E, the node F receives the normal service from the transport entity 5 and sends the normal service, and sends an APS message to the node E for confirmation.

According to a protection switching method provided by this embodiment of the present invention, when protection switching occurs in a protected domain, and when it is determined that there is only a protection transport entity in an adjacent domain, a network node performs protection switching in the adjacent protected domain, and simultaneously sends an APS message that carries a request of triggering inter-domain protection switching, so as to trigger a node that receives the APS message to perform protection switching, so that protection switching can be performed in chain, thereby implementing end-to-end protection switching and enhancing robustness of a protection network.

Embodiment 6

This embodiment provides a protection switching method in the case of a 1:1 unidirectional link fault.

Figure 11:
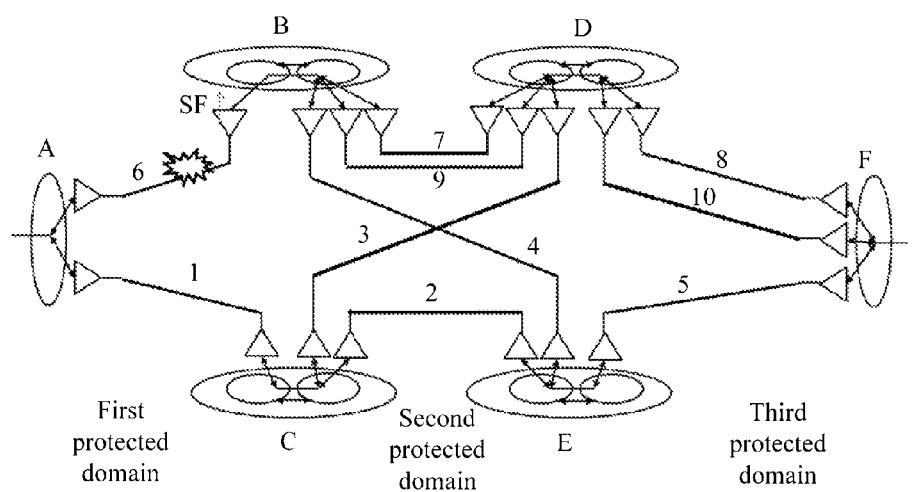
FIG. 11 is a network architecture diagram of a protection network that may be applied in Embodiment 6 of the present invention.

As shown in FIG. 11, nodes B, C, D, and E are configured as boundary nodes; the nodes B and C are configured as peer nodes for each other, and the nodes D and E are configured as peer nodes for each other. A protection mode of each node is configured as a 1:1 unidirectional protection mechanism. Transport entities 6, 7, and 8 are respectively configured as working transport entities of a first protected domain, a second protected domain, and a third protected domain. Correspondingly, a transport entity 1 is configured as a protection transport entity of the working transport entity 6; transport entities 2, 3, 4, and 9 are configured as protection transport entities of the working transport entity 7; and transport entities 5 and 10 are configured as protection transport entities of the working transport entity 8. When the working transport entity 6 in the first protected domain becomes faulty, because the protection mode is a 1:1 unidirectional protection mode, the node B can detect a fault signal—SF signal, and a node A cannot detect a fault. After detecting the fault, the node B finds that corresponding switching needs to be performed.

After an SF alarm appears in a link in the first protected domain, the node B sends an APS message of "notifying that an adjacent protected domain fails" in the second protected domain; and if the APS message is sent by using the transport entities 4 and 9, the message further carries an identifier of the node B. After receiving the message sent by the node B, nodes D and E in the second protected domain determine whether the message is sent by a peer node; and if no, forward the message. The node C receives the APS message of "notifying that an adjacent protected domain fails" forwarded by the node D and/or E, and identifies, according to the identifier of the node B carried in the message, that the message is sent by the peer node. Therefore, the node C initiates an APS switching request in the first protected domain, and performs protection switching. The node C performs switching in the first protected domain, further performs protection switching in the second protected domain simultaneously, and sends an APS message of "triggering inter-domain protection switching" to trigger a subsequent node to perform necessary switching. Specific and detailed steps are similar to those in Embodiment 5, and details are not described herein again.

According to a protection switching method provided by this embodiment, a request message that is from a second protected domain and notifies that an adjacent domain fails is received, and it is identified, according to an identifier carried in the message, that the message is sent by a peer node, thereby knowing that the peer node fails in a first protected domain; then, protection switching is initiated in the first protected domain, which enhances robustness of inter-domain service protection. Further, switching is also initiated in the second protected domain, and an APS message is sent to trigger a next protected domain to perform necessary switching, which can ensure implementation of end-to-end protection switching.

Embodiment 7

This embodiment provides a protection switching method in the case of a 1:1 bidirectional link fault.

Figure 12:
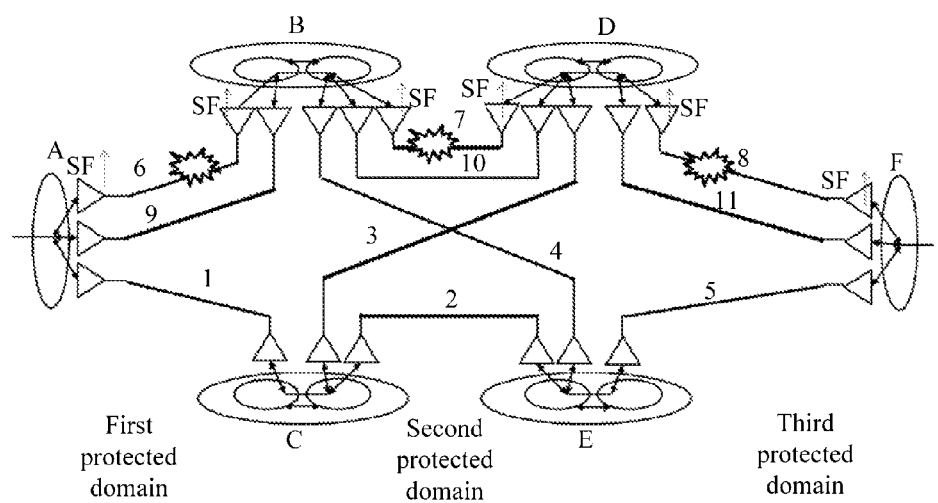
FIG. 12 is a network architecture diagram of a protection network that may be applied in Embodiment 7 of the present invention.

As shown in FIG. 12, nodes B, C, D, and E are configured as boundary nodes. A protection mode of each node is configured as a 1:1 bidirectional protection mechanism. Transport entities 6, 7, and 8 are respectively configured as working transport entities of a first protected domain, a second protected domain, and a third protected domain. Correspondingly, transport entities 1 and 9 are configured as protection transport entities of the working transport entity 6; transport entities 2, 3, 4, and 10 are configured as protection transport entities of the working transport entity 7; and transport entities 5 and 11 are configured as protection transport entities of the working transport entity 8. When the working transport entity 6 in the first protected domain, the working transport entity 7 in the second protected domain, and the working transport entity 8 in the third protected domain become faulty, corresponding switching needs to be performed.

Specifically, a binding relationship between a working transport entity and a protection transport entity may be configured. When there are multiple protection transport entities, priorities of the multiple protection transport entities may continue to be configured. Optionally, a configuration rule of the priorities may be that, a path of a protection transport entity that has a same first node and a same last node with a working transport entity has a higher priority. When protection switching is performed, if an alarm such as an SF or signal degrade (signal degrade, SD) alarm occurs on a protection transport entity with a higher priority, the protection transport entity with the higher priority is not used, and a protection transport entity with a second highest priority is selected. Specifically:

Priority configuration that is shown in Table 3 and in the first protected domain is performed on the node A:

TABLE 3

| Working Transport Entity | Protection Transport Entity | Priority |
|---|---|---|
| Transport entity 6 | Transport entity 9 | High |
|  | Transport entity 1 | Low |

Priority configuration that is shown in Table 4 and in the first protected domain is performed on the node B:

TABLE 4

| Working Transport Entity | Protection Transport Entity | Priority |
|---|---|---|
| Transport entity 6 | Transport entity 9 | High |

Priority configuration that is shown in Table 5 and in the second protected domain is performed on the node B:

TABLE 5

| Working Transport Entity | Protection Transport Entity | Priority |
|---|---|---|
| Transport entity 7 | Transport entity 10 | High |
|  | Transport entity 4 | Low |

Priority configuration that is shown in Table 6 and in the second protected domain is performed on the node C:

TABLE 6

| Working Transport Entity | Protection Transport Entity | Priority |
|---|---|---|
| | Transport entity 3 | High |
| | Transport entity 2 | Low |

Priority configuration that is shown in Table 7 and in the second protected domain is performed on the node E:

TABLE 7

| Working Transport Entity | Protection Transport Entity | Priority |
|---|---|---|
| | Transport entity 4 | High |
| | Transport entity 2 | Low |

Priority configuration that is shown in Table 8 and in the second protected domain is performed on the node D:

TABLE 8

| Working Transport Entity | Protection Transport Entity | Priority |
|---|---|---|
| Transport entity 7 | Transport entity 10 | High |
| | Transport entity 3 | Low |

Priority configuration that is shown in Table 9 and in the third protected domain is performed on the node D:

TABLE 9

| Working Transport Entity | Protection Transport Entity | Priority |
|---|---|---|
| Transport entity 8 | Transport entity 11 | High |

Priority configuration that is shown in Table 10 and in the third protected domain is performed on a node F:

TABLE 10

| Working Transport Entity | Protection Transport Entity | Priority |
|---|---|---|
| Transport entity 8 | Transport entity 11 | High |
| | Transport entity 5 | Low |

When a bidirectional failure occurs on a working transport entity in FIG. 12, a corresponding SF alarm is generated on all working paths of the nodes A, B, D, and F. In the first protected domain, a service between the nodes A and B is switched to the transport entity 9. In the second protected domain, a service between the nodes B and D is switched to the transport entity 10. In the third protected domain, a service between the nodes D and F is switched to the transport entity 11.

According to a protection switching method and system that are provided by this embodiment of the present invention, when protection switching occurs in a protected domain, and when it is determined that there is only a protection transport entity in an adjacent domain, a network node performs protection switching in the adjacent protected domain, and simultaneously sends an APS message that carries a request of triggering inter-domain protection switching, so as to trigger a node that receives the APS message to perform protection switching, so that protection switching can be performed in chain, thereby implementing end-to-end protection switching and enhancing robustness of a protection network. By configuring a priority of each protection transport entity, efficiency of protection switching can be improved, and protection switching time is shortened.

Embodiment 8

This embodiment provides a protection switching method in the case of 1:1 dual link faults.

As shown in FIG. 10, a network topology and a protection mode in Embodiment 8 are the same as those in Embodiment 5, and a difference lies in that priority configuration is added for each node in this embodiment, where the configuration is the same as that in Embodiment 7. After the priority configuration is performed, when initiating protection switching in a second protected domain, a node C selects a transport entity 3 with a high priority to perform protection switching.

Embodiment 9

This embodiment provides a protection switching method in the case of 1+1 multiple faults.

Figure 13:
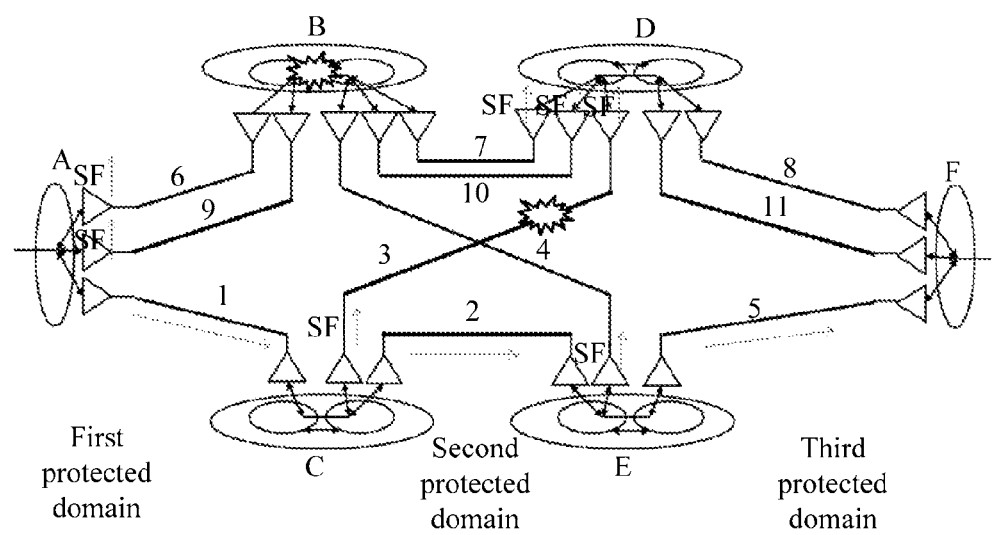
FIG. 13 is a network architecture diagram of a protection network that may be applied in Embodiment 9 of the present invention.

As shown in FIG. 13, nodes B, C, D, and E are configured as boundary nodes; the nodes B and C are configured as peer nodes for each other, and the nodes D and E are configured as peer nodes for each other. Each node is configured as in a 1+1 protection mode. Transport entities 6, 7, and 8 are working transport entities, and others are protection transport entities.

As shown in FIG. 13, when the node B and a transport entity 3 become faulty, switching needs to be performed.

A feature of 1+1 protection is that a normal service is sent through both a working path and a protection path, and only selective receiving needs to be performed at a receive end. When multiple faults in FIG. 13 occur, alarms occur on all transport entities of the node D in a second protected domain, and the node D sends an APS message of "notifying that an adjacent protected domain fails" in a third protected domain, where the message carries an identifier of the node D. After receiving the APS message, a node F does not choose to receive a service sent from the node D, that is, does not select the working transport entity 8, and does not select a transport entity 11 either, but select a service sent through a transport entity 5, thereby implementing protection switching in the third protected domain.

When protection switching occurs in a protected domain, and when it is determined that there is only a protection transport entity in an adjacent domain, a network node performs protection switching in the adjacent protected domain, and simultaneously sends an APS message that carries a request of triggering inter-domain protection switching, so as to trigger a node that receives the APS message to perform protection switching, so that protection switching can be performed in chain, thereby implementing end-to-end protection switching and enhancing robustness of a protection network.

According to a protection switching method provided by this embodiment, a request message notifying that an adjacent domain fails is received; then, protection switching is initiated in a first protected domain, which enhances robustness of inter-domain service protection.

A person of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A protection switching method provided by a first boundary node that is a boundary node of both first and second protected domains, the method comprising:
(a) determining, by the first boundary node, that in the second protected domain, there is only a first protection transport entity connected to the first boundary node, and there is no working transport entity in the second protected domain connected to the first boundary node;
(b) switching, by the first boundary node, a service to the first protection transport entity;
(c) sending, by the first boundary node using the first protection transport entity, a first automatic protection switching (APS) message that carries a request of triggering inter-domain protection switching;
(d) receiving, by the first boundary node, a second APS message from the second protected domain, where the second APS message carries (a) a request of notifying failure of an adjacent protected domain and (b) an identifier of a second boundary node;
(e) determining, by the first boundary node according to the identifier, whether the second boundary node is a peer node of the first boundary node; and
(f) performing, by the first boundary node, protection switching to change a first transport entity in the first protected domain from a standby state to an active state if the second boundary node is determined to be the peer node of the first boundary node.

2. The method according to claim 1, wherein the request of triggering inter-domain protection switching is carried in a request and state field in the first APS message.

3. The method according to claim 1, including
determining that in a third protected domain there is only a second protection transport entity connected to the second boundary node;
performing protection switching in the third protected domain; and
sending a third APS message that carries a request for triggering inter-domain protection switching, wherein the second boundary node is a boundary node of both the second and third protected domains.

4. The method according to claim 1, wherein the method further comprises receiving, by the first boundary node, a third APS message that carries a request of triggering inter-domain protection switching and is sent by using the first transport entity.

5. The method according to claim 1, wherein the method is applied to a 1:1 protection mechanism, and the first protection transport entity is a transport entity with a highest priority among all available transport entities that are in the second protected domain and are connected to the first boundary node.

6. A protection switching method provided by a first boundary node that is a boundary node of both first and second protected domains, the method comprising:
receiving by the first boundary node an automatic protection switching (APS) message from the second protected domain, wherein the APS message carries (a) a request of notifying failure of an adjacent protected domain and (b) an identifier of a second boundary node;
identifying by the first boundary node, according to the identifier, that the second boundary node is a peer node of the first boundary node, wherein the peer node of the first boundary node refers to a node that is another boundary node of both the first and second protected domains;
performing by the first boundary node protection switching in the first protected domain to change a transport entity in the first protected domain from a standby state to an active state when the second boundary node is determined to be the peer node of the first boundary node; and
forwarding by the first boundary node the APS message to the second protected domain if the second boundary node is determined to not be the peer node of the first boundary node.

7. The method according to claim 6, wherein the method further comprises performing, by the first boundary node, protection switching in the second protected domain.

8. The method according to claim 7, wherein performing, by the first boundary node, protection switching in the second protected domain comprises one of the following:
performing, by the first boundary node, protection switching in the second protected domain before the first boundary node performs protection switching in the first protected domain;
performing, by the first boundary node, protection switching in the second protected domain when the first boundary node performs protection switching in the first protected domain; and
performing, by the first boundary node, protection switching in the second protected domain after the first boundary node performs protection switching in the first protected domain.

9. The method according to claim 7, wherein the method further comprises sending, by the first boundary node and in the second protected domain, a second APS message that carries a request of triggering inter-domain protection switching.

10. A network node that is a first boundary node for both first and second protected domains, the network node comprising:
a processor configured to, when a first transport entity connected to the network node and in the first protected domain changes from a standby state to an active state,
(a) determine that in a second protected domain there is only a first protection transport entity connected to the first boundary node, and there is no working transport entity connected to the first boundary node;
(b) switch a service to the first protection transport entity; and
(c) generate a first automatic protection switching (APS) message that carries a request for triggering inter-domain protection switching;
a transmitter configured to send the first APS message by using the first protection transport entity;
a receiver configured to receive a second APS message from the second protected domain that carries (a) a request of notifying that an adjacent protected domain fails and (b) an identifier of the second boundary node; and the processor is further configured to
(a) determine, according to the identifier, whether the second boundary node is a peer node of the network node, wherein the peer node of the network node refers to a node that is a boundary node of both the first and second protected domains; and
(b) perform protection switching to change the first transport entity from the standby state to the active state when the second boundary node is determined to be the peer node of the first boundary node.

11. The network node according to claim 10, wherein the request of triggering inter-domain protection switching is carried in a request and state field in the first APS message.

12. The network node according to claim 10, wherein the first APS message is used to trigger the second boundary node that receives the first APS message to:
(a) switch the service to the first protection transport entity; and
(b) after it is detected that in a third protected domain, there is only a second protection transport entity connected to the second boundary node, perform protection switching in the third protected domain, and send a third APS message that carries a request of triggering inter-domain protection switching, wherein the second boundary node is both a boundary node of the second protected domain and a boundary node of the third protected domain.

13. The network node according to claim 10, wherein:
the receiver further configured to receive a third APS message that carries a request of triggering inter-domain protection switching and is sent by using the first transport entity; and
the processor is further configured to perform protection switching according to the third APS message to change the first transport entity from the standby state to the active state.

14. The network node according to claim 10, wherein the transmitter is further configured to forward the second APS message in the second protected domain when the second boundary node is not a peer node of the network node.

15. The network node according to claim 10, wherein the first protection transport entity is a transport entity with a highest priority among all available transport entities that are in the second protected domain and are connected to the network node.

16. The method according to claim 1 including forwarding, by the first boundary node, the second APS message in the second protected domain if the second boundary node is determined to not be the peer node of the first boundary node.

* * * * *

UNITED STATES PATENT AND TRADEMARK OFFICE
CERTIFICATE OF CORRECTION

PATENT NO. : 10,033,573 B2  
APPLICATION NO. : 14/882219  
DATED : July 24, 2018  
INVENTOR(S) : Ye et al.

Page 1 of 1

It is certified that error appears in the above-identified patent and that said Letters Patent is hereby corrected as shown below:

On the Title Page

Page 2, Item (56), References Cited, Foreign Patent Documents, "CN 102843291 A1" should read -- CN 102843291 A --.

Signed and Sealed this  
Twenty-fifth Day of December, 2018

Andrei Iancu  
*Director of the United States Patent and Trademark Office*